June 5, 1956 R. M. HIGHTOWER ET AL 2,748,995

MEASURED QUANTITY GRANULATED MATERIAL DISPENSING CAPS

Filed Feb. 15, 1954

INVENTOR.
Roy M. Hightower
and
BY Robert F. Hightower
Martin E. Anderson
ATTORNEYS ated June 5, 1956

2,748,995

MEASURED-QUANTITY GRANULATED MATERIAL DISPENSING CAPS

Roy M. Hightower, Grand Junction, and Robert F. Hightower, Denver, Colo.

Application February 15, 1954, Serial No. 410,244

2 Claims. (Cl. 222—449)

This invention relates to dispensing lids for containers and more particularly to measured quantity granulated material dispensing caps.

Lids of plastic or metal provided with pouring spouts have long been used for dispensing granulated materials such as sugar and the like. Quite often it is necessary to pour a teaspoonful or some other measured quantity of a granulated material which requires first pouring it into the teaspoon or measuring device before transferring it to the recipe. Certainly one of the most common occasions requiring a measured quantity of a granulated material is the addition of sugar to coffee or tea and the difficulty in guessing the correct amount without means for properly measuring the sugar, can easily render the resultant coffee or tea completely unpalatable.

It is the object of the present invention to overcome the aforementioned difficulty by providing a measuring chamber incorporated within the lid or cover of a granulated material dispenser with a valve assembly which, upon a rapid and simple movement of the finger will close the entrance to said chamber and open the discharge spout to effect a transfer of the measured quantity of the material held therein.

A second object of the invention herein described is to provide a device which can be readily incorporated into the conventional sugar dispensing cover or lids thus converting them to a measured quantity dispenser.

A further object is to provide a lid or cover of the type described which is simple, inexpensive, easily manipulated and capable of delivering the correct amount of material each time it is used.

Other objects will be in part apparent and in part specifically pointed out hereinafter in connection with the description of the accompanying drawing which follows, and in which.

Figure 1:
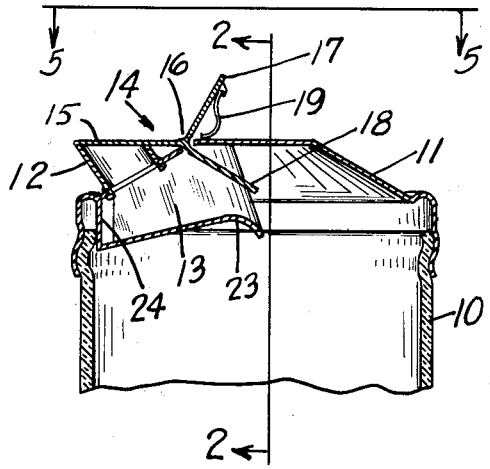
Figure 1 is a diametrical section of the dispensing cap claimed herein showing the measuring chamber and the valve assembly along with a fragmentary portion of a granulated material container as seen in the direction of arrows 1—1, Figure 2.

Referring now in particular to Figure 1 of the drawing, reference numeral 10 designates a container of the type in which granulated materials are placed, such as a glass sugar jar, having the measured quantity dispensing cover 11 secured to the open end thereof by a threaded connection. The lid top is provided with a pouring spout 12, of a well known type, adjacent its edge. A measuring chamber 13, which will be described in detail in connection with other figures of the drawing, is positioned on the underside of the lid to communicate with the spout. A valve assembly, designated in general by numeral 14, is mounted for pivotal movement in an opening in the top of the lid and comprises, a spout cover 15 extending outwardly from the pivot point 16 to form a seal for the outer end of the spout when said cover is in closed position, a finger plate 17 extends upwardly from the pivot point for effecting pivotal movement of the valve assembly, and a door or valve member 18 extending downwardly from the pivot point into the container, which, upon pivotal movement in the direction to raise spout cover 15, will close the entrance to the measuring chamber, and upon pivotal movement in the opposite direction will open the measuring chamber and close the discharge spout. In one embodiment of the invention, a spring 19 is attached to the rear face of the finger plate, extending downward to the top of the cap and thereafter curving forward toward the spout, thus forming means for holding the spout cover in closed position over the spout.

Figure 2:
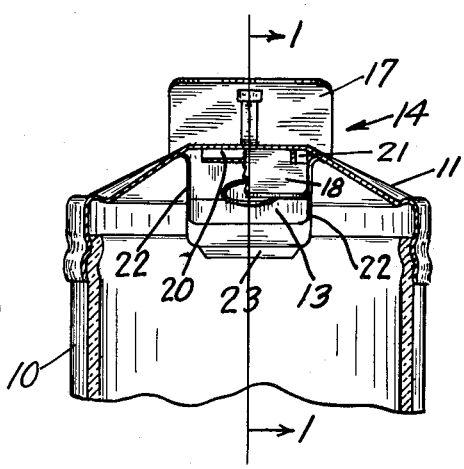
Figure 2 is a section taken in the direction of arrows 2—2, Figure 1.

Figure 2 shows a slot 20 in the cover perpendicular to the diameter of said cover which passes through the center of the spout. Within the slot is positioned a door 18 which is provided with notches 21 in each edge to hold the valve assembly within said slot. Measuring chamber 13 comprises, spaced side walls 22 attached to the underside of the lid top, a forward end wall 24 which has its outer surface adjacent the inner surface of the container, and a bottom wall 23 curved downward slightly at its inner end to form a cam surface on which the door may ride when pivoted into closed position. The inner surfaces of the side walls and the bottom wall form a frame closely engaging the door in closed position.

Figure 3:
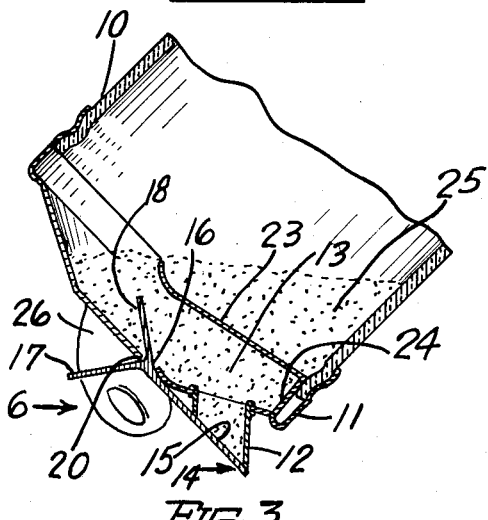
Figure 3 is a diametrical section similar to Figure 1 showing the container tilted into position to fill the chamber, with a finger shown as holding the valve assembly in spout closing position.

Figure 3 illustrates the container and lid in position to fill the measuring chamber with a granulated material 25. The container is grasped with finger 26 in position on top of the valve assembly to exert a force in the direction of arrow 6 which closes the spout and opens the door to the measuring chamber permitting material to enter and fill same. It is to be understood that the embodiment of the invention shown in Figures 1 and 2 wherein a spring is used, the action of the finger in holding the valve in spout closing position becomes unnecessary.

Figure 4:
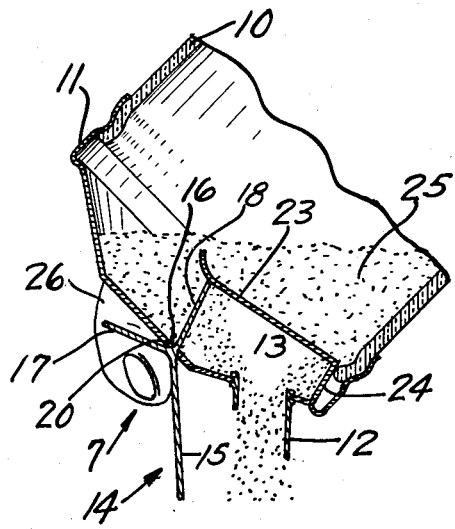
Figure 4 is a diametrical section similar to Figure 3 except that the valve assembly is in position to discharge the material from the chamber; and, Figure 5 is a top plan view taken in the direction of arrows 5—5 in Figure 1 with only half of the valve assembly shown and the lid partly broken away to better show the construction of the measuring chamber.

Figure 4 shows the gate in position to deliver the granulated material through the spout. The direction of the force applied by the finger is changed to that indicated by arrow 7 which opens the spout cover allowing the chamber to empty through the spout and also closes the measuring chamber with the door preventing more of the granulated material from entering said chamber. When the embodiment of Figures 1 and 2 is used the finger action is opposed to the force exerted by the spring on the valve assembly.

Figure 5:
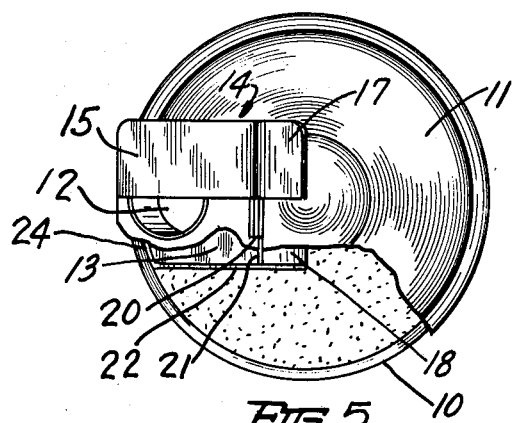

Figure 5 shows the top of the lid with half of the spout cover in place over the spout. The relationship between the door 18, slot 20, and side walls 22 of the measuring chamber can also be seen in this view.

We claim:

1. A measuring device adapted to form a closure for an open top vessel, comprising, a lid having a cylindrical flange for telescoping over the open end of a vessel, the top of the lid having a measuring compartment of which the top forms the outer wall, said compartment having an open end adjacent the center of the lid, that portion of the lid forming the outer wall of the compartment having an outwardly projecting discharge spout, a valve member having two angularly related arms one of which projects through an opening in the lid, the other arm being positioned on the outside of the lid and movable into position to close the discharge spout, the two arms being so related to the inner wall of the measuring compartment and to the spout that when the spout is covered the entrance into the measuring compartment will be open admitting material thereinto and when the spout is opened to permit the discharge of material the entrance into the compartment will be closed.

2. A device in accordance with claim 1 in which means comprising a spring is operatively connected to the valve assembly and the lid and tensioned to normally hold the valve assembly in spout closing position.

References Cited in the file of this patent
UNITED STATES PATENTS

| | | |
|---|---|---|
| 513,803 | Luster | Jan. 30, 1894 |
| 1,285,206 | Johnson et al. | Nov. 19, 1918 |